W. F. FOLMER.
PHOTOGRAPHIC CAMERA.
APPLICATION FILED JULY 16, 1908.
1,023,930.
Patented Apr. 23, 1912.
5 SHEETS—SHEET 5.
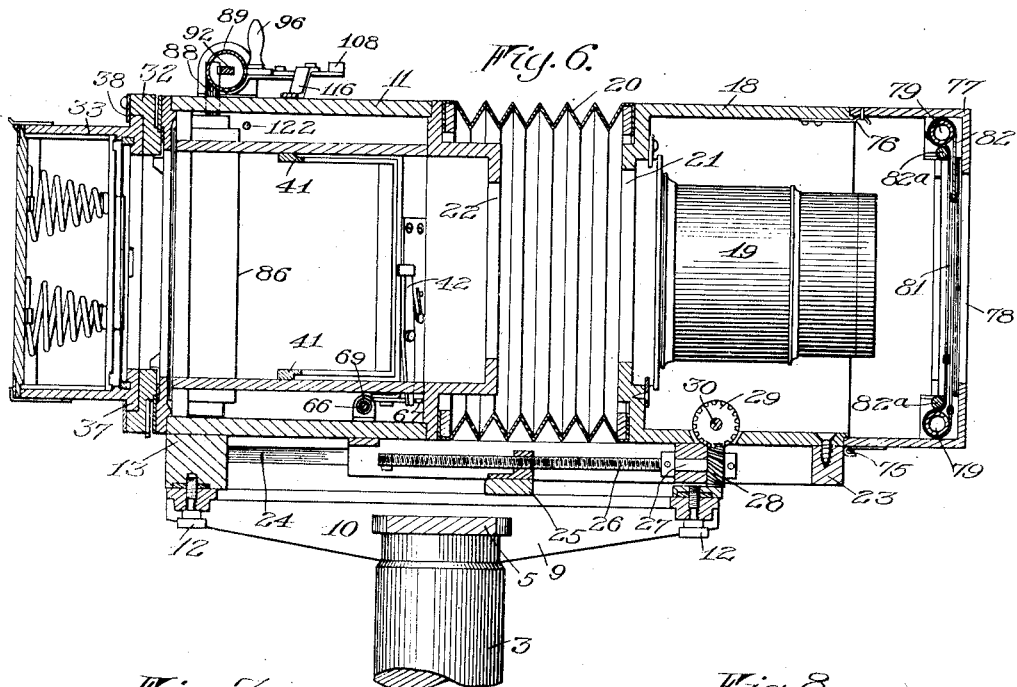
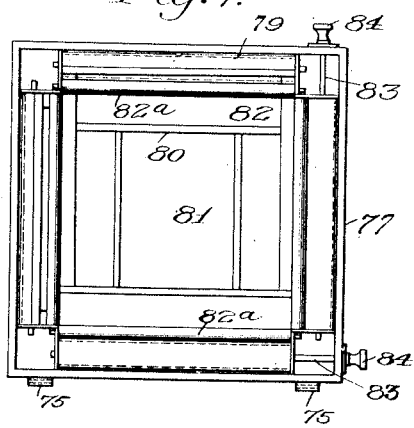
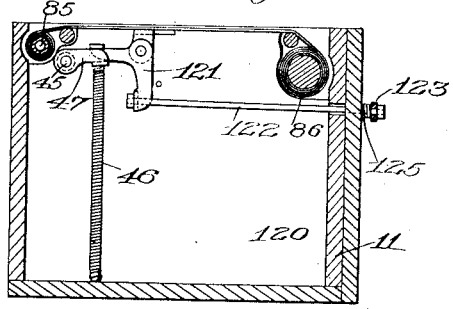

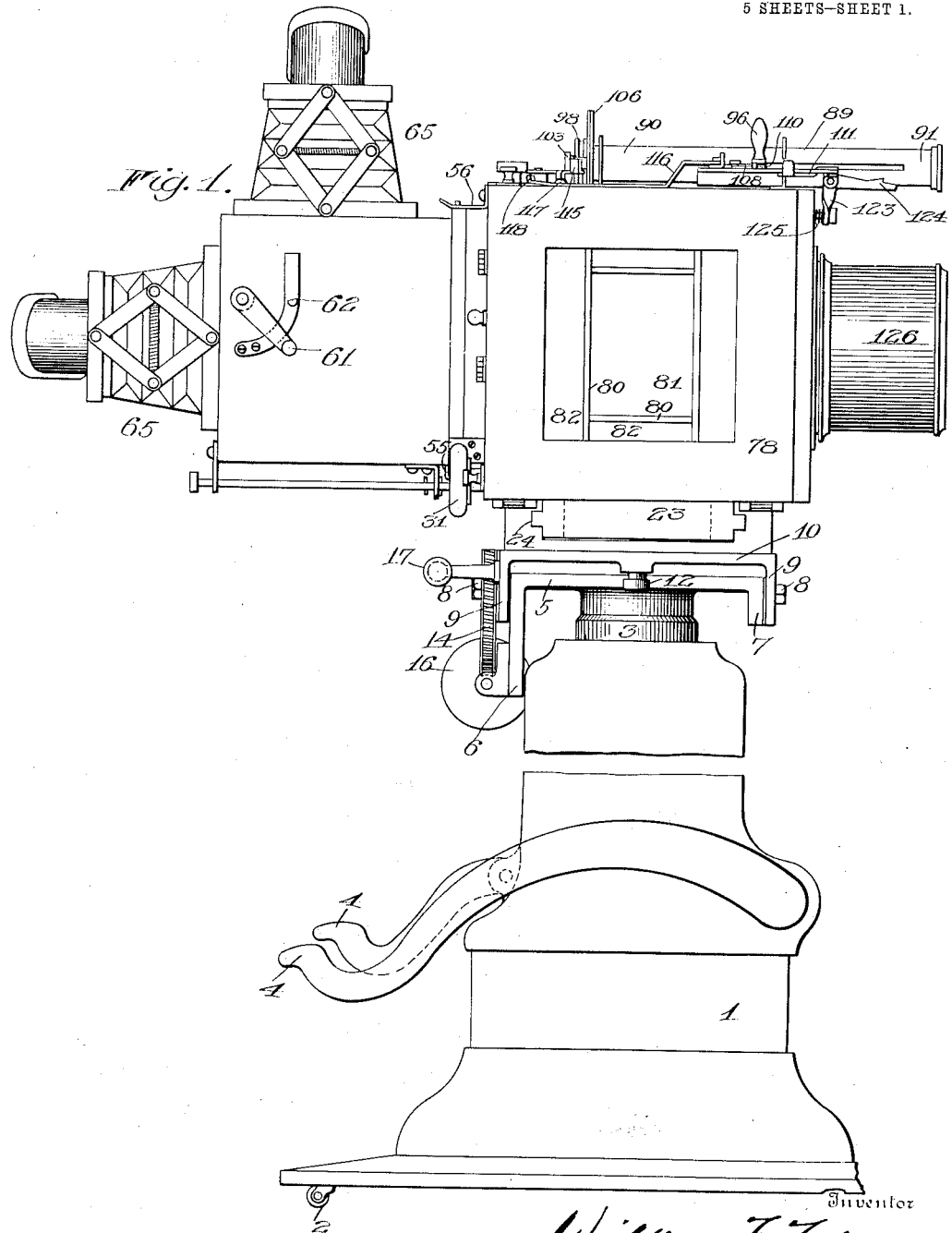

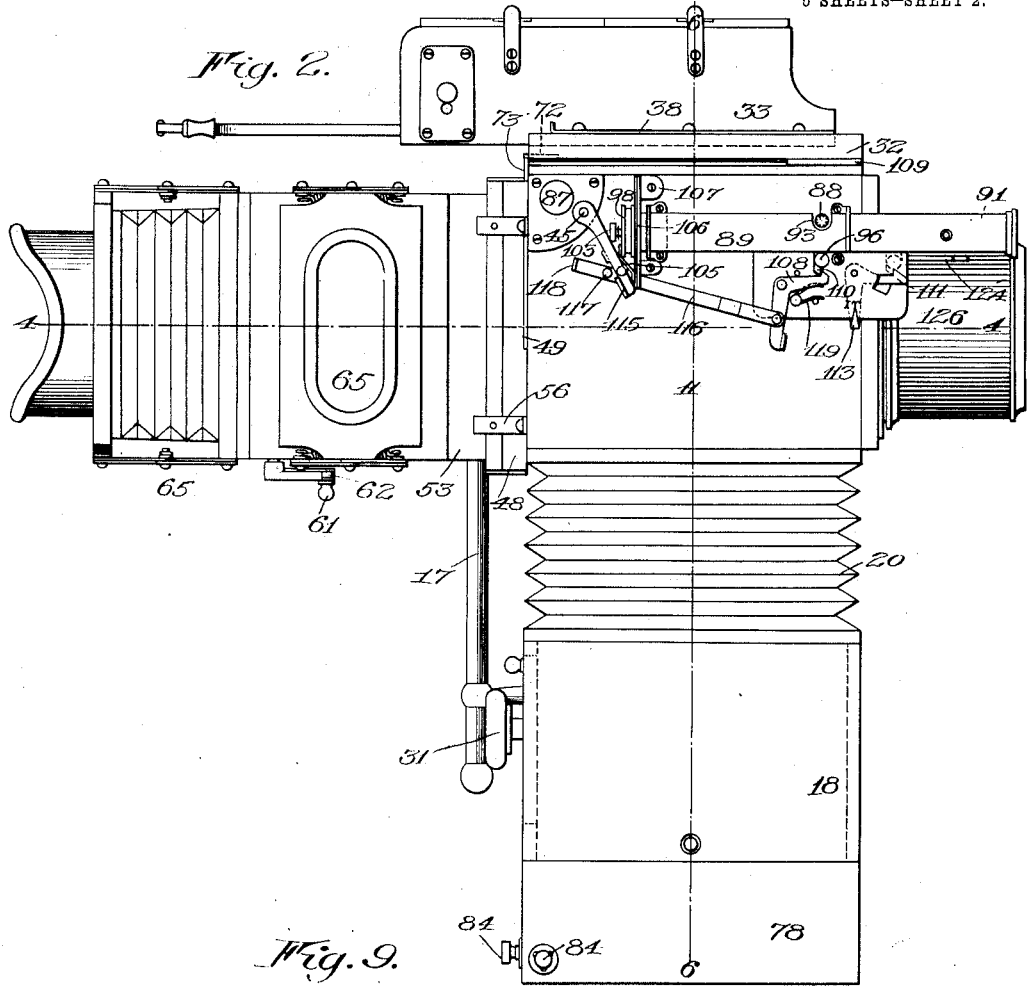
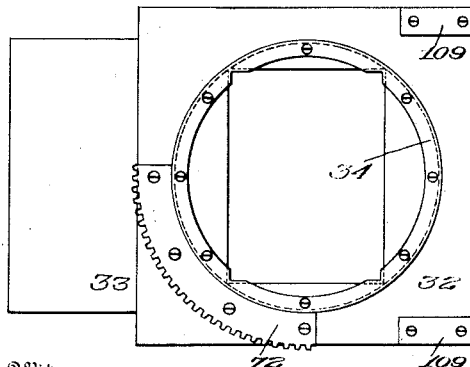
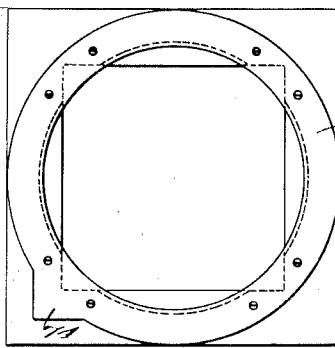

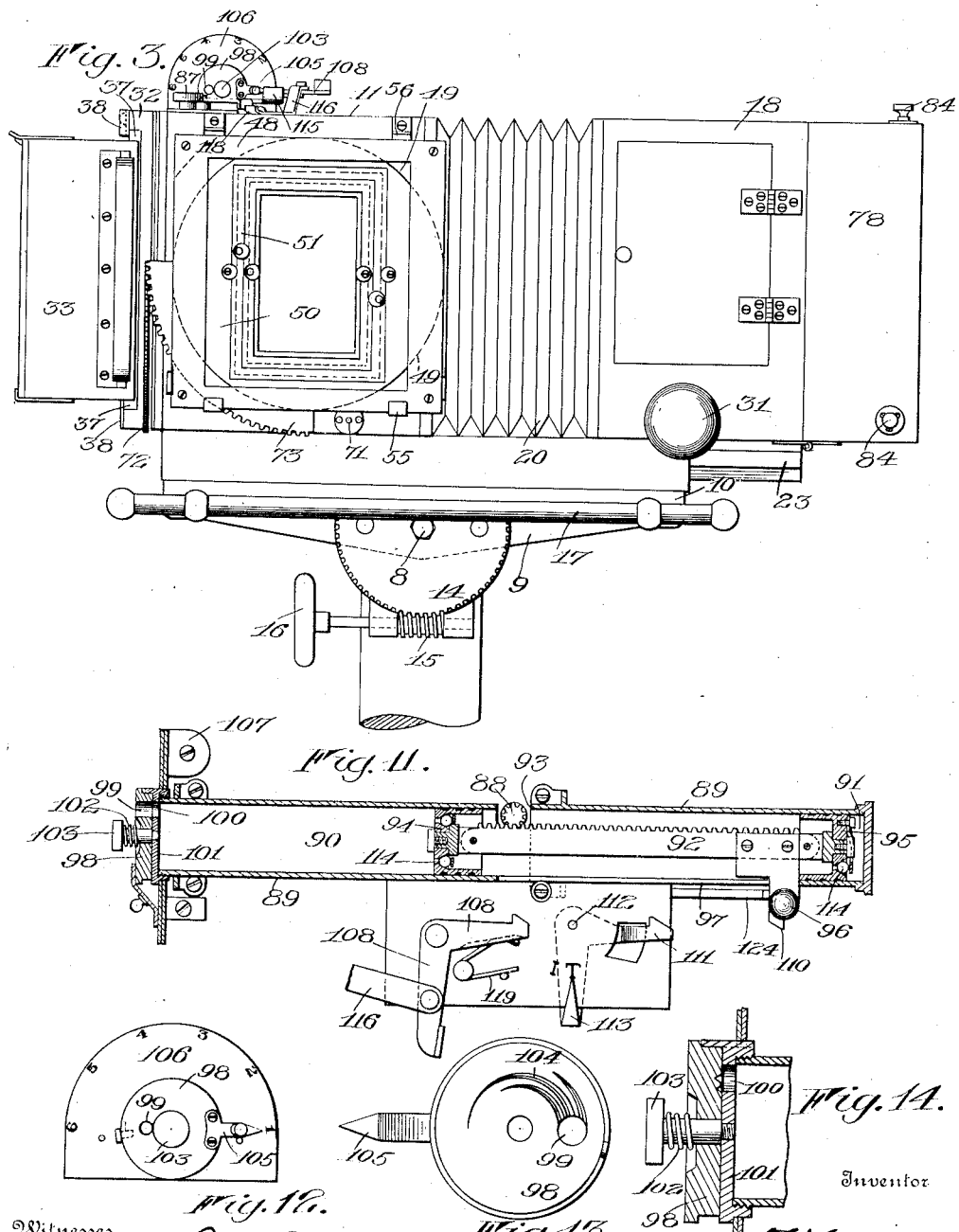

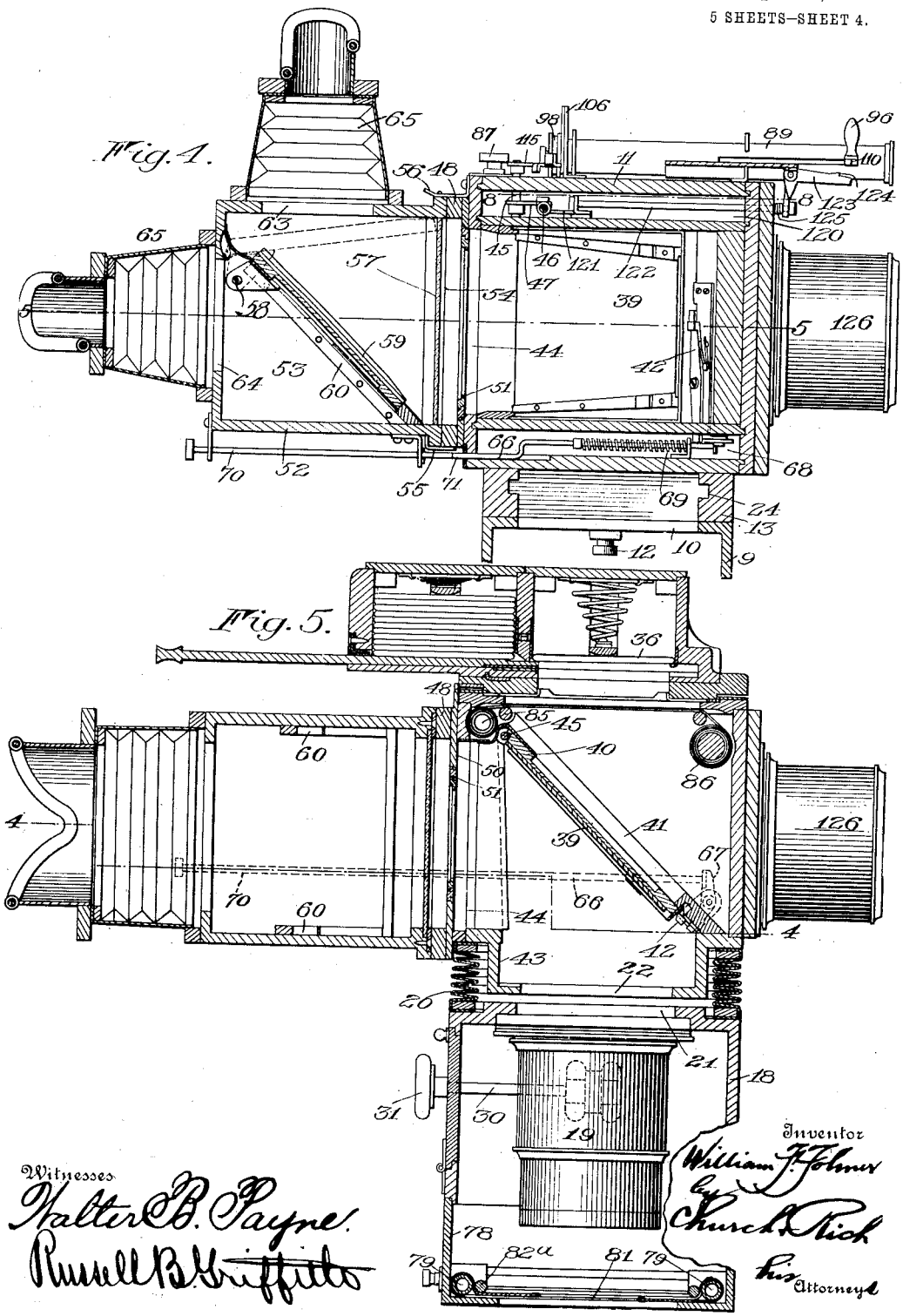

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

PHOTOGRAPHIC CAMERA.

1,023,930. Specification of Letters Patent. Patented Apr. 23, 1912.

Application filed July 16, 1908. Serial No. 443,768.

*To all whom it may concern:*

Be it known that I, WILLIAM F. FOLMER, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and has for its object to provide an efficient and conveniently operable camera particularly adapted to the conditions and needs of studio photograhy, though parts of the invention are more widely applicable and seek to improve the art generally as to the features of camera construction, toward which they are directed.

To these and other ends the invention consists in certain improvements and combinations of parts all as will be hereinafter more fully described, the novel features being pointed out in the claims at the end of the specification.

In the drawings: Figure 1 is a front elevation of a camera constructed in accordance with and illustrating one embodiment of my invention: Fig. 2 is a top plan view thereof; Fig. 3 is a side elevation, the box containing parts of the focusing devices and forming the auxiliary focusing chamber being removed; Fig. 4 is a vertical transverse sectional view taken substantially on the line 4—4 of Fig. 2; Fig. 5 is a horizontal sectional view taken substantially on the line 5—5 of Fig. 4; Fig. 6 is a vertical longitudinal sectional view taken substantially on the line 6—6 of Fig. 2; Fig. 7 is a detail rear elevation of the light regulating diaphragm; Fig. 8 is a detail sectional view taken substantially on the line 8—8 of Fig. 4 and illustrating a plan of the devices through which the main focusing mirror establishes control over parts connected with the shutter mechanism; Figs. 9 and 10 are elevations of the coöperating portions of the plate holder carrying back and camera box respectively through which the former is permitted a change of position in the focal plane of the camera lens; Fig. 11 is a longitudinal horizontal section through the retarding mechanism for the shutter, adjacent parts being shown in elevation; Fig. 12 is an end elevation of the controlling and indicating mechanism of the retarding device; Fig. 13 is a detail of one of its parts; and Fig. 14 is a section through the said controlling devices corresponding to that of Fig. 11 but showing a different position of adjustment.

Similar reference numerals in the several figures indicate similar parts.

In the present embodiment of this invention and as before indicated, the improvements are shown applied to a camera adapted, as a whole, more particularly to indoor work such as portrait photography for which purpose it may be made relatively heavy in construction and in the present instance comprises (Figs. 3 and 6) a base 1, preferably mounted on rollers 2 and carrying a telescoping vertically movable standard 3 which may be elevated or lowered to suit the height of the subject by suitable mechanism such as is employed in dental and barber chairs and controlled by the foot levers 4. The standard 3 is provided with a transversely extending head 5 having depending lugs 6 and 7 to which is pivoted at 8, by means of depending lugs 9, a supporting frame 10. The main camera box or body 11 is rigidly secured to this frame 10, being detachably held in place in the present instance by a bolt 12 which connects the main portion of the frame, before referred to, with a portion 13 removable with the camera box. Journaled on one of the lugs 9 is a worm gear 14 which meshes with a worm 15 on the lug 6 of the standard head 5 so that by operating a knob 16 on the said worm the supporting frame 10 is rocked vertically in either direction whereby the elevation of the lens may be changed at will and with slight effort. Handle bars 17 are preferably provided on one of the supporting elements to enable the structure as a whole to be moved about.

The lens carriage or camera front comprises in the present instance a housing 18 (Fig. 6) for the lens tube 19 which is connected to the body 11 with the usual bellows 20 surrounding communicating openings 21 and 22 in the two members and is carried upon a frame 23 that slides toward and from the camera body in ways formed by grooves or channels 24 in the inner sides of the frame 13. The latter is provided with an intermediate cross bar 25 into which is threaded a rod 26 journaled at 27 in the carriage frame 23 and on the said rod is a spiral gear 28 that meshes with a similar gear 29 on a shaft 30 extending transversely of the lens carriage and terminating in a knob 31 through the rotation of which it will be seen that a focus adjusting movement of the carriage can be effected.

The camera back 32 (Figs. 6, 9 and 10) carrying the removable plate or film holder 33, which I have illustrated in the present instance as of the magazine type, is rotatably mounted on the wall of the camera body in rear of the lens, by means of an annular plate 34 on the inner face of the back with which coöperates a similar and overlapping plate 35 on the body 11 forming a bearing that permits a rectangular sheet of sensitized material 36 to be supported in the focal plane of the camera lens with its greatest dimension extending either horizontally or vertically to suit the corresponding extent of an object or group of objects. This adaptation of the sensitized sheet is particularly necessary in portrait work and is often accomplished with small cameras by turning the instrument bodily upon its side, but in an instrument of the present type this is of course impracticable. The plate holder 33 is also preferably removable with relation to the back 32 through the provision of coöperating flanges 37 and 38 on the two parts respectively, one of the flanges, 38, being, in the present instance, rendered movable into and out of coöperative position.

Movable horizontally within the camera body 11 is a focusing mirror 39 carried on a flap or frame 40 and automatically actuated from an operative position against a diagonal seat 41 where it is retained by a catch 42, to an inoperative position against a seat 43 to close an opening 44 in a side wall of the camera box through which the reflected image is projected. The flap controls the access of light to the sensitized sheet and, upon the release of the catch 42 is rotated on its shaft 45 by means of a spring 46 (Fig. 8) connected to an arm 47 thereon, which parts will be hereinafter referred to.

Surrounding the lateral opening 44 in the camera body is a rigidly attached frame 48 (Figs. 3, 4 and 5) the inner face thereof being provided with an annular recess 49 shown in dotted lines in Fig. 3 within which is arranged a rotary partition member 50 having a series of concentrically arranged rectangular plates 51 each fitting within similarly shaped openings in the other whereby the removal of the larger from an opening in the partition removes all and provides an aperture of maximum extent in the latter and a removal of the smaller, merely, provides an opening of minimum extent, all for purposes to be hereinafter explained. In the present instance but two of these plates have been shown.

Removably secured to the main box or camera body 11 is a box 52 forming an auxiliary focusing chamber 53 communicating with the main chamber of the camera through the opening 44 in the latter (Figs. 4 and 5), the said box being arranged with an open side 54 against the frame 48 and secured as by a bracket 55 and a spring catch 56. Arranged across the opening 54 is a ground glass or other suitable focusing screen 57 and pivoted at 58 within the chamber 53 is a second focusing mirror 59 similar to the mirror 39 but movable vertically, and in operative position when at rest upon a seat 60, said mirror being capable of rotation to the position shown in dotted lines in Fig. 4 at the top of the chamber and retained there by means of a crank 61 on the exteriorly projecting end of its shaft that is adapted to be sprung over the detent 62 (Fig. 1). An opening 63 is provided in the top of the box 52 and a similar opening 64 in the side wall thereof, each of which openings is surrounded by a focusing hood 65 of any preferred construction.

It will be seen from the foregoing that the image produced by the lens is reflected from the main focusing mirror 39 through an aperture of a given size in the partition member 50 onto the focusing screen 57 where it is directly viewable through the opening 64 with the mirror 59 in its raised position, or else viewable in the mirror 59 through the opening 63 at the top, the position of the mirror in either case being such as to close the opening which is not in use during the focusing operation from the entrance of light that would tend to reduce the definition of the image. This double focusing arrangement enables the operator to focus conveniently whether the camera is in the usual elevated position or dropped to an extremely low position, such as is necessary for instance in photographing children sitting or playing upon the floor.

When the mirror 39 is rotated from inoperative position after the desired focus has been obtained, it closes the opening 44 and shuts off the rest of the focusing devices from the camera proper. Such actuation is controlled by a rod 66 (Fig. 4) adapted to engage one arm of a bell crank lever 67, the opposite end of which is connected to the catch lever 42, said controlling devices being arranged within a chamber 68 beneath the main chamber of the camera. The rod 66 is normally held out of operative engagement with the bell crank 67 by means of a spring 69 but is operated to release the mirror frame by means of a rod 70 carried by the box 52 and coöperating with an exteriorly projecting end 71 of the rod 66 when the two boxes are assembled.

The purpose of the partition member 50 is to so control the light rays passing therethrough that the image finally reflected upon the screen 57 will correspond exactly, in shape and size, with the effective area of the sensitized surface, that is, the field of the picture which is sought and two openings are provided in the present instance as heretofore described because the particular plate holder shown is adapted to two sizes of plates, the two openings corresponding to the sizes. In this way the photographer can determine accurately whether the desired portions of the image are in correct position on the plate and within the area to be exposed before the exposure is made. But since as before described, the plate holder 33 is so mounted that the rectangular sheet of sensitized material therein, corresponding in shape to the openings in the partition member, may be rotated to different positions, I therefore connect the plate holder and partition member, which are arranged upon adjoining faces of the preferably cubical main camera box to rotate together so that the sensitized sheet and the openings in the partition will also correspond in position, and when that of one is changed the other will adjust itself to agree. This I accomplish in the present instance by means of toothed segments 72 and 73 meshing with each other and arranged upon the back 32 and partition 50 respectively, as shown in Figs. 3, 5 and 9, the relative rotary movement of the holder and back being limited in both directions by stop plates 109 in the holder which engage a shoulder 74 upon the coöperating ring 35 of the camera back to limit the rotary adjustment (Figs. 9 and 10).

Camera lenses being spherical cast an image having a spherical field, but the present camera and most cameras in fact are adapted for rectangular sheets of sensitized material, with the result that the field of the image must be of sufficient size to circumscribe the rectangular area to be exposed and the rays of light falling within the outlying chords are lost and accomplish no useful purpose. On the contrary they are decidedly disadvantageous as is the admission of any light which is not recorded upon the plate or film because they result in a complicated diffusion within the camera that impairs the effectiveness of the rays that strike within the borders of the plate or film. To prevent as far as possible the entrance of these particular rays, or at any rate, reduce their number and the entrance of the marginal illumination I provide a diaphragm which I arrange in front of the lens, the opening in said diaphragm being rectangular in form and adjustable in shape whereby only a pyramidal pencil of light is allowed to reach the lens and the more intense central portion of the field of the image cast thereby has a tendency to assume the same form and the same relative proportions as the opening, the marginal rays being excluded to a great extent at any of the sides in the discretion of the operator as each pair of opposite edges of the opening are made independently adjustable.

I construct the diaphragm in the present instance in the following manner; Removably secured to the front of the lens housing 18 as by an open pivotal bearing 75 and a catch 76 is a frame 77 carrying on the four sides of its open rear face supports 79 arranged in pairs, the members of each pair being parallel to each other and extending at right angles to the other pair. These supports in the present instance comprise rollers over each pair of which is passed an endless curtain 80, having open and opaque portions 81 and 82 respectively movable alternately into and out of register as the rollers are rotated guiding rollers 82$^a$ being preferably provided to keep the portions of the curtain that are extended between the supporting rollers in substantially the same plane. The edges of the opaque portions travel in opposite directions in planes on opposite sides of the rollers and define a rectangular opening adjustable as to the dimensions extending in the direction of movement of the curtain, and as the two curtains cross each other at right angles the result is that the opening in the diaphragm, as a whole, is adjustable as to size along both of its dimensions though always of the same geometrical form and having its sides, as defined by the relatively movable edges of the curtains, extending horizontally and vertically to correspond with that of the sensitized material in the holder and with the openings in the partition 50. The shafts of one member of each pair of rollers are extended as at 83 and provided with thumb pieces 84 at the top and side of the frame 77 respectively so that the two curtains are movable independently and may be adjusted by the operator while inspecting the image on the focusing screen to produce the desired light effects. The rays incident to the lens at the more extreme angles, the reflections of which are ordinarily multiplied within the lens tube, bellows or upon other surfaces in advance of the sensitized surface are completely shut off.

Referring now more particularly to Figs. 2, 5, 8, and 11 the shutter which I provide in the present instance is of the well known apertured curtain type, being mounted to operate in a horizontal direction at the rear of the camera box 11 between a tension roller 85 and a winding roller 86 having perpendicular axes, the tension roller 85 being wound through suitable intermediate mechanism by means of a knob 87 while the upper projecting end of the winding roller 86 carries a pinion 88. Mounted preferably upon the top of the box 11 is a tube 89 the ends of which are closed and form opposed fluid cylinders 90 and 91. Within the tube is a reciprocatory rack bar 92 which meshes with the pinion 88 on the winding roller through an aperture 93 in the tube and at its two ends the rack bar is provided with pistons 94 and 95, the former operating in the cylinder 90 and the latter in the cylinder 91. A handle portion 96 on the rack bar projects through a longitudinal slot 97 in the tube 89 and extends between the cylinders and by this means the rack bar and pistons are manually operable. The admission of air to the cylinder 90 is regulated by a revoluble disk 98 having an aperture 99 therein which moves in and out of register with a similar aperture 100 in the cylinder head 101 the said disk being held yieldingly against the latter by a spring 102 confined between it and a shoulder on a pin 103 rigid with the cylinder head. Leading from the aperture 99 on the inner face of the disk (Fig. 13) are one or more channels 104 of decreasing cross sectional area so that as the disk is rotated and the aperture therein and that in the cylinder head are moved out of direct communication they will still admit air to the cylinder in constantly decreasing volume until the end of the channel connecting them is reached, as will be understood. An indicating finger 105 on the disk 98 coöperates with a stationary scale 106.

Pivoted on the top of the camera adjacent to the tube 89 is a pawl 108 arranged in the path of and adapted to engage a projection 110 on the rack bar 92.

In Fig. 11 the parts are shown in the position occupied after an exposure the curtain shutter being wound upon the tension roller 85. To reset the shutter for a subsequent exposure the rack bar is moved toward the opposite end of the tube by means of the handle 96 until the projection 110 engages behind the pawl 108 in which position the piston 94 will be adjacent to the aperture 100 at the base of its cylinder while the opposite piston 95 will be removed from the cylinder 91. This movement of the rack bar winds the curtain upon the winding roller 86 through the pinion 88 and against the power of the tension roller. When the pawl 108 is released the unwinding of the curtain from the roller carrying the pinion 88 drives the rack bar 92 in the opposite direction and the movement of the piston 94 causes air to be drawn in through the openings 99 and 100 in a volume corresponding to the extent of freedom of adjustment of the communication between the two openings as heretofore described and the rack bar will move accordingly with greater or less speed as predetermined upon the scale 106. The piston 94 will have completed its movement before the piston 95 has entered its cylinder which it does only after the exposing operation of the shutter has been effected, the said piston being rendered ineffective during the greater part of its movement by the slot 97 in the tube 89, its purpose being merely to absorb the shock or impact and bring the curtain to a gentle stop. The shutter aperture is of course passing across the sensitized field during the time the piston 94 is traversing its cylinder and the foregoing operation is the one which takes place during an instantaneous or automatically timed exposure. For the instantaneous work the openings 99 and 100 in the regulated disk and piston head are in direct register which allows the entrance of a sufficient volume of air to remove the retarding element entirely from the operation, but for a time exposure of indefinite length a second pawl 111, somewhat similar to the pawl 108 and similarly placed in the path of the projection 110 is pivoted at 112 to the top of the camera box, which pawl arrests the rack bar and shutter after the projection 110 is released from the pawl 108 at a time when the shutter aperture is coincident with the field of exposure. This pawl is released by hand after the desired duration of exposure and the closing movement of the shutter takes place during the balance of the movement of the parts. The said timing pawl is movable to two positions one in and the other out of the path of the projection 110 which are conveniently indicated by the letters I and T respectively through a pointer 113 thereon.

To prevent the pistons from resisting the resetting movement they are each provided with ball check valves 114 that allow the air to escape through them in one direction.

As it is desirable in cameras of this class that the shutter be operated at the same instant that the focusing mirror frame 40 is rotated to its inoperative position when the focus has been satisfactorily arranged in order that no time may be lost between the completion of the focus and the exposure whereby the view would be changed, I provide means for releasing the retarding devices, which latter control the shutter in all its movements by the action of the focusing mirror, as will now be described.

The upper projecting end of the mirror shaft 45 carries, rigidly secured thereto, an exteriorly arranged lever 115 which extends across a link 116 guided upon a pin 117 and provided at one end with an abutment 118 while the other end is pivoted to the retaining pawl 108, which latter is normally held in operative position in the path of the projection 110 by its spring 119, as shown in Fig. 2, the parts as represented in the said figure being set or in position for an exposure of the shutter. When the mirror frame or flap 40 is released by the rod 70, the lever 115, by means of which the mirror was set in the first instance, is rotated with it and, upon the mirror reaching its inoperative position against the lateral opening 44 in the camera box, the said lever simultaneously engages the abutment 118 on the link 116 and through it releases the retaining pawl 108.

As the shutter is dependent upon the flap 40 to protect the sensitized surface during its own resetting movement it is desirable that devices be provided which will prevent such resetting before the resetting of the flap or mirror. The means which I employ for this purpose is best illustrated in Figs. 4 and 8 and is partially arranged within a chamber 120 above the main chamber of the camera. In this chamber is located the arm 47 and operating spring 46, before described, on the mirror shaft 45 which arm is adapted to engage a bell crank lever 121 when the mirror is set and operate a rod 122, connected to the bell crank, in one direction, the said rod projecting exteriorly of the camera box. The said projecting end is connected to a bell crank 123, the opposite arm of which is in the form of a catch 124 normally held in the path of the projection 110 of the resetting devices by a spring 125 interposed between the end of the rod 122 and the side of the camera casing. The catch 124 is effective in a reverse direction from that of the pawls 108 and 111 at the end of the path of the projection 110, so it will be seen that when the arm 47 is not in engagement with the bell crank 121 by reason of the mirror, being in inoperative position, the spring 125 will raise the catch and prevent the rack bar from being moved, but the opposite position of the arm 47 will operate the rod 122 against the tension of the spring 125 and retract the catch when the mirror is in position to prevent access of light to the sensitized material.

Portrait photographers often have difficulty in obtaining satisfactory likenesses because of their inability to catch the subject with a natural expression or in a natural position. The person whose picture is being taken may suffer from self consciousness when confronted with the camera lens and, possessed with knowledge that his appearance at that particular moment is about to be recorded, advertently attempts a graceful pose whereas the position of the body desired by the photographer is that unconsciously assumed under ordinary conditions. In order to offset this tendency by rendering the external appearance of the camera such as to keep the subject ignorant of the period of exposure and, further, of the fact that the camera is being focused upon him at all, I provide the latter with a dummy lens or lens tube 126 (Figs. 1, 2, 4 and 5) which is arranged upon a side of the camera box 11 opposite the focusing devices in such a manner that its apparent axis is angular to the actual axis of the camera lens but seemingly coincident with the line of vision of the photographer when sighting through the focusing apertures. As the real lens is concealed (in the present instance by the housing 18 and diaphragm frame 77) the operator can easily deceive the real subject of the sitting into believing that a little preliminary focusing or other adjustment is being made or that another person is being photographed, by pointing the dummy lens in such a direction while the real lens has the subject within its field all the time.

I claim as my invention:

1. The combination with a camera having two focusing openings adapted to relatively angular lines of vision, of a focusing screen directly viewable through one of said openings and means for reflecting an image cast thereon at a point in the line of vision for which the other opening is adapted.

2. The combination with a camera having two focusing openings adapted to relatively angular lines of vision, of a focusing screen directly viewable through one of said openings, means for reflecting the image thereof through the other and means for automatically closing one of them to the admission of light when the other is brought into use.

3. The combination with a camera having two focusing openings adapted to relatively angular lines of vision, of a focusing screen directly viewable through one of said openings and a movable mirror for reflecting an image cast thereon in the line of vision for which the other is adapted, said mirror being in position to close one opening against the admission of light into the camera when operatively arranged with respect to the other.

4. The combination with a camera, of means for exposing a sensitized area in different relative positions in the focal plane thereof, a relatively stationary focusing screen, means for regulating the field of the image cast thereon to correspond in shape with that of the sensitized area to be exposed and means for automatically controlling the position of said field to correspond to that of the area to be exposed.

5. The combination with a camera, of a rotatable holder for retaining a sheet of sensitized material in different relative positions in the focal plane thereof, a relatively stationary focusing screen, a device for regulating the field of the image cast thereon to correspond in shape and position with that of the sensitized sheet and means for controlling the regulating device through rotation of the holder to change the position of said field to accord with the changed position of the sensitized sheet.

6. The combination with a camera, of a rotatable holder for retaining a sheet of sensitized material in different relative positions in the focal plane thereof, a relatively stationary focusing screen, a rotatable partition member arranged in advance of the latter and having an opening therein corresponding in shape with that of the sensitized sheet and means for simultaneously rotating the partition member and holder.

7. The combination with a camera, of a rotatable holder for retaining a sheet of sensitized material in different relative positions in the focal plane thereof, a relatively stationary focusing screen, a rotatable partition arranged in advance of the latter upon an axis angular to that of the holder and having an opening therein corresponding in shape to that of the sensitized sheet and coöperating driving members on the partition and holder for effecting a simultaneous rotation thereof.

8. In a camera, the combination with a support provided with ways and a lens carriage movable on the latter, and embodying a housing for the lens, of a rod threaded into the support and journaled in the lens carriage, a shaft extending through the housing and having an operating portion on the exterior thereof and intermeshing driving elements on the shaft and rod.

9. The combination with a camera, of a light regulating device comprising two pairs of oppositely arranged supports, the members of each pair being arranged parallel to each other and at right angles to those of the other pair and curtains arranged on the supports to travel transversely across each other, each curtain embodying an endless strip passing over a pair of the supports and having apertures and solid portions adapted to register alternately to produce an adjustable opening.

10. The combination with a camera provided with suitable shutter mechanism, of a retarding device operated by the shutter mechanism during exposure, said shutter mechanism being operated to a position for a subsequent exposure by a resetting movement of the retarding device.

11. The combination with a camera, provided with suitable shutter mechanism and with a focusing mirror, each controlling the access of light to the sensitized material, of a retarding device operated by the shutter during exposure, said shutter being operated to a position for a subsequent exposure by a resetting movement of the retarding device, and means for locking the latter to prevent the shutter from being operated thereby while the mirror is in a position to admit the passage of light to the sensitized material.

12. The combination with a camera provided with a curtain and a winding roller therefor; of a reciprocatory rack bar, a pinion driven by the roller and coöperating with the rack bar and means for retarding the movement of the latter.

13. The combination with a camera provided with a curtain shutter and a winding roller therefor, of two fluid cylinders, a rack bar, pistons on the latter operating in the cylinders and a pinion driven by the roller and coöperating with the rack bar, the parts being so arranged that one piston traverses its cylinder during the exposing movement of the shutter and the other at the end of said movement.

14. The combination with a main camera box, and an automatically actuated pivoted flap arranged therein, of a second box removably secured thereto and communicating therewith, focusing devices carried by the latter, controlling devices for the flap carried on the main box and an operating member therefor carried on the removable box and coöperating with the controlling devices when the two boxes are assembled.

15. The combination with a camera, of a shutter mechanism, means driven thereby for retarding said mechanism during the exposing movement of the shutter and means for rendering the retarding means inoperative as such during the resetting movement of the shutter.

WILLIAM F. FOLMER.

Witnesses:
RUSSELL B. GRIFFITH,
HAROLD H. SIMMS.